(12) United States Patent
Ved

(10) Patent No.: US 11,068,353 B1
(45) Date of Patent: Jul. 20, 2021

(54) SYSTEMS AND METHODS FOR SELECTIVELY RESTORING FILES FROM VIRTUAL MACHINE BACKUP IMAGES

(71) Applicant: Veritas Technologies LLC, Mountain View, CA (US)

(72) Inventor: Amber Ved, San Jose, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 512 days.

(21) Appl. No.: 15/717,560

(22) Filed: Sep. 27, 2017

(51) Int. Cl.
G06F 11/14 (2006.01)
G06F 9/455 (2018.01)

(52) U.S. Cl.
CPC ...... *G06F 11/1469* (2013.01); *G06F 9/45558* (2013.01); *G06F 2009/45583* (2013.01); *G06F 2201/84* (2013.01)

(58) Field of Classification Search
CPC .......... G06F 11/1469; G06F 2201/815; G06F 11/1458; G06F 16/128; G06F 2201/84; G06F 2212/152; G06F 9/45558; G06F 2009/45583
See application file for complete search history.

(56) References Cited

U.S. PATENT DOCUMENTS

| | | | |
|---|---|---|---|
| 6,934,725 B1 * | 8/2005 | Dings ................. | G06F 11/1466 707/610 |
| 7,743,035 B2 * | 6/2010 | Chen ..................... | G06F 3/0605 707/674 |
| 8,099,391 B1 * | 1/2012 | Monckton ........... | G06F 11/1451 707/647 |
| 8,209,298 B1 * | 6/2012 | Anglin ................ | G06F 11/1469 707/610 |
| 8,346,727 B1 * | 1/2013 | Chester ................. | G06F 16/188 707/640 |
| 8,495,023 B1 * | 7/2013 | Tsaur .................. | G06F 11/1448 707/646 |
| 8,825,972 B1 * | 9/2014 | Tsaur .................. | G06F 11/1453 711/162 |

(Continued)

OTHER PUBLICATIONS

Breuer et al.; The Network Block Device; Linux Journal; https://www.linuxjournal.com/article/3778, Sep. 22, 2012 pp. 1-5.

(Continued)

*Primary Examiner* — Cheyne D Ly
(74) *Attorney, Agent, or Firm* — FisherBroyles, LLP

(57) ABSTRACT

The disclosed computer-implemented method for selectively restoring files from virtual machine backup images phrase may include (i) exposing a virtual disk image included in a target virtual machine backup image to an operating system of a host computing system, (ii) mounting the virtual disk image included in the target virtual machine backup image to the host computing system, (iii) determining at least one extent of a target file included in a file system included in the virtual disk image, (iv) associating the extent of the target file with a storage location included in the target virtual machine backup image, (v) generating a catalog comprising the extent of the target file associated with the storage location included in the target virtual machine backup image, and (vi) restoring the target file from the target virtual machine backup image by using the generated catalog.

20 Claims, 7 Drawing Sheets

(56) References Cited

U.S. PATENT DOCUMENTS

| | | | | |
|---|---|---|---|---|
| 8,930,423 | B1* | 1/2015 | Surampudi | G06F 16/188 |
| | | | | 707/821 |
| 9,251,020 | B1* | 2/2016 | Kalekar | G06F 16/184 |
| 9,336,131 | B1* | 5/2016 | Sabjan | G06F 12/02 |
| 9,411,821 | B1* | 8/2016 | Patwardhan | G06F 11/1446 |
| 9,632,877 | B1 | 4/2017 | Yin et al. | |
| 9,658,925 | B1 | 5/2017 | Damodharan et al. | |
| 9,805,068 | B1* | 10/2017 | Sabjan | G06F 11/1417 |
| 10,592,350 | B2* | 3/2020 | Dornemann | G06F 11/3433 |
| 2007/0180509 | A1* | 8/2007 | Swartz | G06F 9/4406 |
| | | | | 726/9 |
| 2009/0300084 | A1* | 12/2009 | Whitehouse | G06F 12/0866 |
| 2009/0313447 | A1* | 12/2009 | Nguyen | G06F 11/1451 |
| | | | | 711/162 |
| 2012/0011340 | A1* | 1/2012 | Flynn | G06F 12/0246 |
| | | | | 711/171 |
| 2012/0158666 | A1* | 6/2012 | Anglin | G06F 11/1469 |
| | | | | 707/679 |
| 2014/0046900 | A1* | 2/2014 | Kumarasamy | G06F 11/1489 |
| | | | | 707/620 |
| 2017/0147446 | A1* | 5/2017 | Zhang | G06F 3/0617 |
| 2017/0161150 | A1* | 6/2017 | Rosin | G06F 16/275 |

OTHER PUBLICATIONS

User Space Definition; http://www.linfo.org/user_space.html; created Feb. 8, 2005, pp. 1.
Singh; Develop your own filesystem with FUSE; available at https://www.ibm.com/developerworks/library/l-fuse/index.html; Updated: Oct. 14, 2014, pp. 1-12.
Layton; User Space File Systems Linux Magazine; available at http://www.linux-mag.com/id/7814/, Jun. 21, 2010 pp. 1-7.
Pomeranz; SANS Digital Forensics and Incident Response Blog; Understanding EXT4 (Part 3): Extent Trees; https://digital-forensics.sans.org/blog/2011/03/28/digital-forensics-understanding-ext4-part-3-extent-trees, pp. 1 5.
Pfeiffer; Writing a FUSE Filesystem: a Tutorial; https://www.cs.nmsu.edu/~pfeiffer/fuse-tutorial/, Mar. 25, 2016 pp. 1-2.
Loopback Device; OSDev.org; http://wiki.osdev.org/Loopback_Device; as accessed on Sep. 22, 2017, pp. 1-9.
Tarasov et al.; Terra Incognita: On the Practicality of User-Space File Systems; https://www.usenix.org/system/files/conference/hotstorage15/hotstorage15- tarasov.pdf; as accessed on Sep. 22, 2017, pp. 1-5.
Wikipedia; Extent (file systems); https://en.wikipedia.org/wiki/Extent_(file_systems); accessed on Sep. 8, 2017, p. 1-2.
Wikipedia; Filesystem in Userspace; https://en.wikipedia.org/wiki/Filesystem_in_Userspace; as accessed Sep. 7, 2017, pp. 1-3.
Wikipedia; Loop device; https://en.wikipedia.org/wiki/Loop_device; as accessed Sep. 7, 2017, pp. 1-3.
Wikipedia; Network block device; https://en.wikipedia.org/wiki/Network_block_device; as accessed on Sep. 16, 2017, pp. 1-2.
Wikipedia; NTFS; https://en.wikipedia.org/wiki/NTFS; as accessed on Sep. 15, 2017, pp. 1-18.
Wikipedia; Virtual file system; https://en.wikipedia.org/wiki/Virtual_file_system; as accessed Sep. 10, 2017, pp. 1-4.

* cited by examiner

SYSTEMS AND METHODS FOR SELECTIVELY RESTORING FILES FROM VIRTUAL MACHINE BACKUP IMAGES

BACKGROUND

Organizations increasingly rely on virtual machines to store and/or process digital data. To protect against data loss, an organization may use a backup system to back up entire virtual machines as virtual machine backup images (also "virtual machine backup image files"). Such virtual machine backup images may store some or all the virtual computing resources of a virtual machine, including images of virtual disk devices included in the virtual machine, and the data files stored therein.

Unfortunately, once a data file has been stored in a virtual machine backup image, it can be difficult to selectively recover that data file without also recovering all the other data included in the virtual machine backup image. This may be because different file systems (e.g., NTFS, XFS, BTRFS, ZFS, etc.) that may be utilized by virtual disks may store files in unique ways. Hence, blocks of data stored on virtual disks in accordance with different file systems may be backed up to virtual machine backup images in unique ways.

Some traditional selective file restoration solutions may require backup system developers to create tools that understand where blocks of data initially stored in accordance with a particular file system in a virtual disk are stored by the backup system in a virtual machine backup image. However, development of such "mapping" tools can be costly and difficult, and different tools may be required for every virtualization platform, virtual disk type, and/or file system a backup system vendor wishes to support.

Accordingly, the instant disclosure identifies and addresses a need for additional and improved systems and methods for selectively restoring files from virtual machine backup images.

SUMMARY

As will be described in greater detail below, the instant disclosure describes various systems and methods for selectively restoring files from virtual machine backup images by determining an extent of a target file included in a virtual disk image included in a target virtual machine backup image, associating the extent of the target file with a storage location included in the virtual machine backup image, and accessing the data stored at the storage location.

In one embodiment, a method for selectively restoring files from virtual machine backup images may include (i) exposing a virtual disk image included in a target virtual machine backup image to an operating system of a host computing system, and (ii) mounting the virtual disk image included in the target virtual machine backup image to the host computing system. The method may further include (i) determining at least one extent of a target file included in a file system included in the virtual disk image, (ii) associating the extent of the target file with a storage location included in the target virtual machine backup image, and (iii) generating a catalog comprising the extent of the target file associated with the storage location included in the target virtual machine backup image. The method may also include restoring the target file from the target virtual machine backup image by (i) using the generated catalog to identify the storage location included in the target virtual machine backup image that is associated with the extent of the target file, and (ii) accessing data stored at the identified storage location included in the target virtual machine backup image.

In at least one embodiment, exposing the virtual disk image included in the target virtual machine backup image to the operating system of the host computing system includes creating a user space file system that includes the virtual disk image in a user space of the host computing system. In such embodiments, creating the user space file system in the user space of the host computing system comprises using a file-system-in-user-space (FUSE) driver to create the user space file system based on the target virtual machine backup image.

In some embodiments, associating the extent of the target file included in the file system included in the virtual disk image with at least one storage location included in the target virtual machine backup image includes (i) directing the operating system of the host computing system to access the target file, (ii) identifying a storage block included in the target virtual machine backup image that the operating system of the host computing system accesses when the operating system of the host computing system is directed to access the target file, and (iii) designating the identified storage block as the storage location associated with the extent of the target file included in the file system. In such embodiments, directing the operating system of the host computing system to access the target file included in file system may include directing the operating system of the host computing system to perform a simulated read of the target file.

In at least one embodiment, identifying the storage location included in the target virtual machine backup image that the operating system of the host computing system accesses when the operating system of the host computing system is directed to access the target file may include using the FUSE driver to monitor the target virtual machine backup image to identify one or more file system operations that the operating system of the host computing system performs with respect to the target virtual machine backup image when the operating system of the host computing system is directed to access the target file.

In some examples, mounting the virtual disk image to the host computing system may include mounting the virtual disk image to the host computing system as at least one of (i) a loop device, and (ii) a network block device. In some examples, determining the extent of the target file may include querying the operating system of the host computing system to identify the extent of the target file.

In some embodiments, determining the extent of the target file may include accessing at least one entry in a file index maintained by the file system included in the virtual disk image. In such embodiments, the file index may include at least one of (i) an extent tree, (ii) an extent list, (iii) a file extent map, (iv) a file block map, (v) a file allocation table, (vi) a master file table, (vii) an inode table, and (viii) a dnode array.

In at least some embodiments, the target virtual machine backup image may include an initial virtual machine backup image. In such examples, the target virtual machine backup image may further include a differential virtual machine backup image based on the initial virtual machine backup image.

In one example, a system for selectively restoring files from virtual machine backup images may include several modules stored in memory, including (i) an exposing module that exposes a virtual disk image included in a target virtual machine backup image to an operating system of a host computing system, and (ii) a mounting module that mounts the virtual disk image included in the target virtual machine backup image to the host computing system. The system may further include (i) a determining module that determines at least one extent of a target file included in a file system included in the virtual disk image, (ii) an associating module that associates the extent of the target file with a storage location included in the target virtual machine backup image, and (iii) a generating module that generates a catalog comprising the extent of the target file associated with the storage location included in the target virtual machine backup image. The system may further include a restoring module that restores the target file from the target virtual machine backup image by (i) using the generated catalog to identify the storage location included in the target virtual machine backup image that is associated with the extent of the target file, and (ii) accessing data stored at the identified storage location included in the virtual machine backup image. The system may also include at least one processor that executes the exposing module, the mounting module, the determining module, the associating module, the generating module, and the restoring module.

In at least one embodiment, exposing the virtual disk image included in the target virtual machine backup image to the operating system of the host computing system may include using a FUSE driver to create a user space file system that includes the virtual disk image in a user space of the host computing system.

In some examples, associating the extent of the target file included in the file system included in the virtual disk image with at least one storage location included in the target virtual machine backup image may include (i) directing the operating system of the host computing system to access the target file, (ii) identifying a storage block included in the target virtual machine backup image that the operating system of the host computing system accesses when the operating system is directed to access the target file, and (iii) designating the identified storage block as the storage location associated with the extent of the target file included in the file system. In such examples, directing the operating system of the host computing system to access the target file included in file system may include directing the operating system of the host computing system to perform a simulated read of the target file.

In at least one example, identifying the storage block included in the target virtual machine backup image that the operating system of the host computing system accesses when the operating system is directed to access the target file may include using the FUSE driver to monitor the target virtual machine backup image to identify one or more file system operations that the operating system performs with respect to the target virtual machine backup image when the operating system of the host computing system is directed to access the target file.

In some embodiments, mounting the virtual disk image to the host computing system may include mounting the virtual disk image to the host computing system as at least one of (i) a loop device, and (ii) a network block device. In some examples, determining the extent of the target file may include querying the operating system of the host computing system to identify the extent of the target file.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) expose a virtual disk image included in a target virtual machine backup image to an operating system of a host computing system, and (ii) mount the virtual disk image included in the target virtual machine backup image to the host computing system. The computer-readable medium may further include one or more computer-executable instructions that, when executed by at least one processor of a computing device, may cause the computing device to (i) determine at least one extent of a target file included a file system included in the virtual disk image, and (ii) associate the extent of the target file with a storage location included in the target virtual machine backup image, and (iii) generate a catalog that includes the extent of the target file associated with the storage location included in the target virtual machine backup image. The computer-readable medium may further include one or more computer-executable instructions that, when executed by at least one processor of a computing device, may cause the computing device to restore the target file from the target virtual machine backup image by (i) using the generated catalog to identify the storage location included in the target virtual machine backup image that is associated with the extent of the target file, and (ii) accessing data stored at the identified storage location included in the target virtual machine backup image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
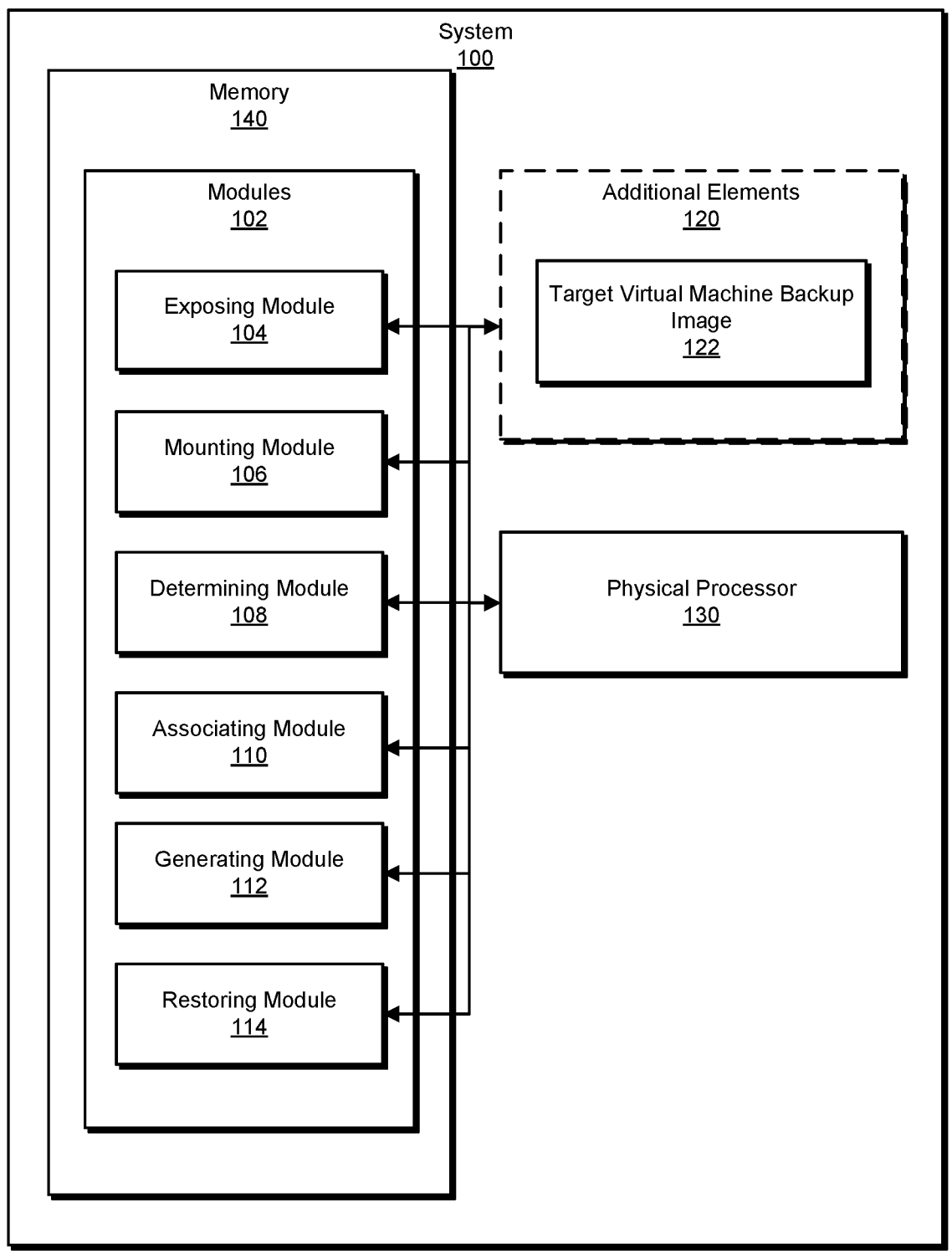
FIG. 1 is a block diagram of an example system for selectively restoring files from virtual machine backup images.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for selectively restoring files from virtual machine backup images. As will be explained in greater detail below, by exposing a virtual disk image included in a target virtual machine backup image to an operating system of a host computing system and mounting the virtual disk image to the host computing system, the systems and methods described herein may be able to utilize resources of the host computing system (e.g., kernels, operating systems, volume managers, file systems, etc.) to determine an extent (e.g., one or more extents) of a target file included in the virtual disk image. The systems and methods disclosed herein may also be able to associate the determined extent with a storage location included in the target virtual machine backup image, and generate a catalog that includes the extent of the target file associated with the storage location.

Additionally, the systems and methods described herein may be able to restore the target file from the virtual machine backup by using the generated catalog to identify the storage location in the target virtual machine backup image that is associated with the extent of the file, and thus directly access the data stored at the identified storage location. Hence, once the catalog is generated, the restoration process may be completed simply and directly utilizing only the target virtual machine backup image and the catalog, without need of additional computing resources (e.g., another physical or virtual machine distinct from the host computing system) or costly development of virtual-file-system-to-backup-image mapping utilities.

Moreover, the systems and methods described herein may improve the functioning and/or performance of a computing device by conserving computing resources. The systems and methods described herein may allow for direct restoration of target files from a virtual machine backup image without requiring additional processing to access virtual resources (e.g., virtual volume managers, virtual machine file systems, etc.) included in the virtual machine backup image. These systems and methods may also improve the fields of endpoint computing and/or backup systems by providing faster user access to data (e.g., target files) stored in a virtual machine backup image.

The following will provide, with reference to FIGS. 1-2 and 4-7, detailed descriptions of example systems for selectively restoring files from virtual machine backup images. Detailed descriptions of corresponding computer-implemented methods will also be provided in connection with FIG. 3.

FIG. 1 is a block diagram of an example system 100 for selectively restoring files from virtual machine backup images. As illustrated in this figure, example system 100 may include one or more modules 102 for performing one or more tasks. As will be explained in greater detail below, modules 102 may include an exposing module 104 that exposes a virtual disk image included in a target virtual machine backup image to an operating system of a host computing system. Example system 100 may also include a mounting module 106 that mounts the virtual disk image included in the target virtual machine backup image to the host computing system.

Additionally, example system 100 may also include a determining module 108 that determines at least one extent of a target file included in a file system included in the virtual disk image. The term "extent" as used herein, generally refers to a contiguous area of computer storage reserved for a file in a file system. In some examples, an extent may be represented as a location and a range. In such examples, an extent corresponding to a file may be expressed as a location within a storage medium and a range of blocks of storage at the location. A file may include one or more extents. For example, file A may include extent 1, extent 2, and extent 3, each associated with a different range of blocks of storage at a different location on the same or different storage mediums. Additional examples and illustrations of extents and their relationship with file systems will be provided in connection with FIGS. 5-7 below.

As used herein, the term "block" may refer to any discrete unit of data. In some examples, the term "block" may refer to a fixed-size unit of data within a file. For example, the term "block" may refer to a block, a cluster, and/or a sector. Additionally or alternatively, in some examples the term "block" may refer to a variable-size unit of data, such as an extent.

Example system 100 may also include an associating module 110 that associates the extent of the target file with a storage location included in the target virtual machine backup image, and a generating module 112 that generates a catalog that may include the extent of the target file associated with the storage location included in the target virtual machine backup image. Example system 100 may further include a restoring module 114 that restores the target file from the target virtual machine backup image. In some examples, restoring module 114 may use the generated catalog to identify the storage location included in the target virtual machine backup image that is associated with the extent of the target file, and access data stored at the identified storage location included in the target virtual machine backup image. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the device illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate selectively restoring files from virtual machine backup images. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as target virtual machine backup image 122. Target virtual machine backup image 122 generally represents any type or form of data that includes a backup of a virtual machine. In one example, target virtual machine backup image 122 represents a data file that includes a backup of a virtual machine. Target virtual machine backup image 122 may include a backup of any suitable virtual machine created by and/or accessible through any suitable hypervisor technology. Example hypervisors may include, but are not limited to, VMWARE, WINDOWS HYPER-V, KERNEL-BASED VIRTUAL MACHINE (KVM), OPENSTACK, VIRTUALBOX, and so forth. Additionally, target virtual machine backup image 122 may include a virtual machine backup image created by any suitable virtual machine backup solution. In some examples, target virtual machine backup image 122 may include a virtual machine backup image created by VERITAS NETBACKUP backup software.

Figure 2:
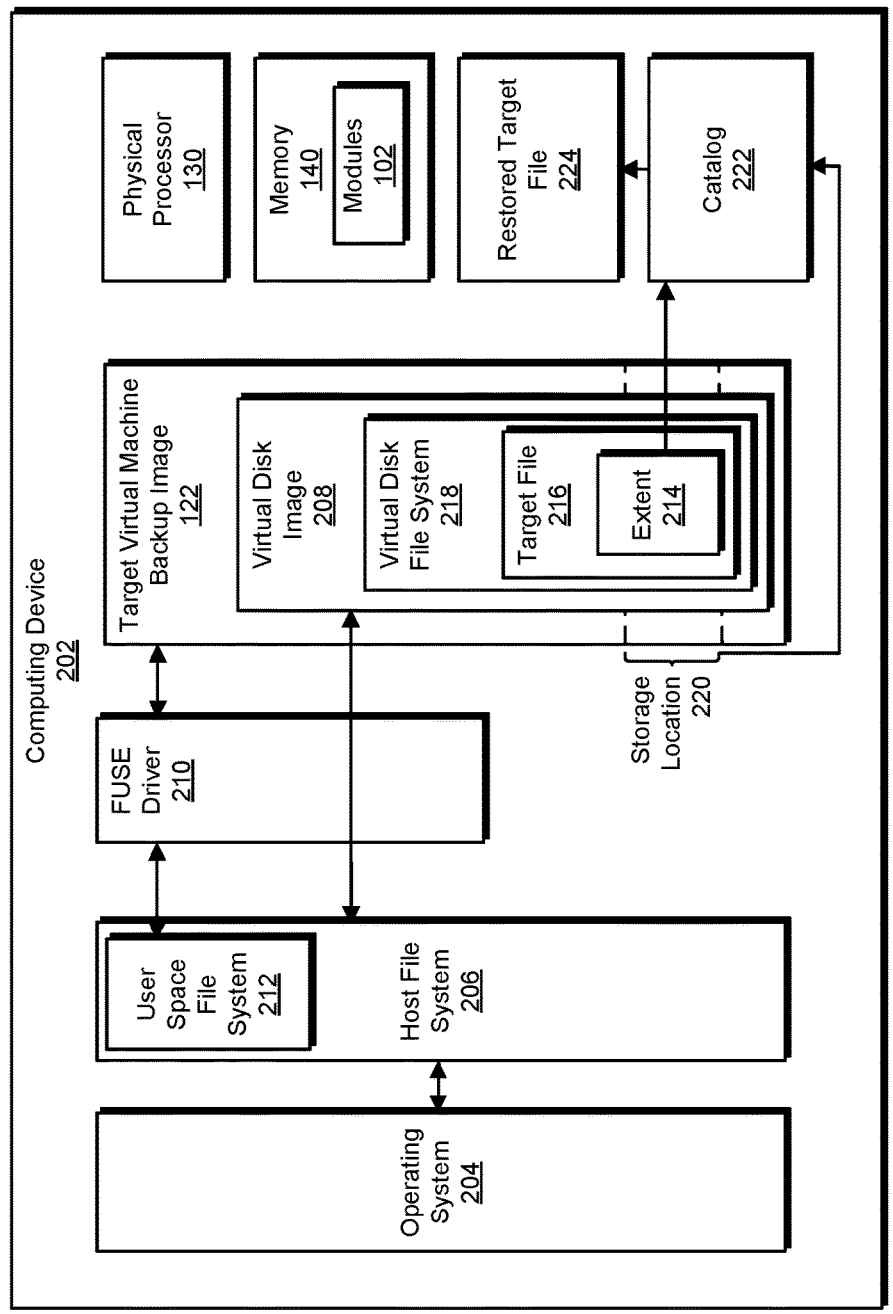
FIG. 2 is a block diagram of an example system for selectively restoring files from virtual machine backup images.

Example system 100 in FIG. 1 may be implemented in a variety of ways. For example, all or a portion of example system 100 may represent portions of system 200 in FIG. 2. As shown in FIG. 2, system 200 may include a computing device 202. In one example, computing device 202 may be programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to selectively restore files from virtual machine backup images.

For example, as will be described in greater detail below, computing device 202 may include operating system 204 and host file system 206, and computing device 202 may have access to (e.g., by way of a suitable storage subsystem) target virtual machine backup image 122. Exposing module 104 may expose a virtual disk image (e.g., virtual disk image 208) included in a target virtual machine backup image (e.g., target virtual machine backup image 122) to an operating system (e.g., operating system 204) of a host computing system (e.g., computing device 202). In some embodiments, exposing module 104 may expose target virtual machine backup image 122 to operating system 204 by using FUSE driver 210 to create a user space file system (e.g., user space file system 212) within host file system 206 that includes virtual disk image 208.

Mounting module 106 may then mount the virtual disk image included in the target virtual machine backup image to the host computing system (e.g., via host file system 206). Determining module 108 may then determine at least one extent (e.g., extent 214) of a target file (e.g., target file 216) included in a file system included in the virtual disk image (e.g., virtual disk file system 218).

Associating module 110 may then associate the extent of the target file with a storage location included in the target virtual machine backup (e.g., storage location 220). Generating module 112 may then generate a catalog (e.g., catalog 222) that includes the extent of the target file associated with the storage location included in the target virtual machine backup image. Restoring module 114 may then restore the target file (e.g., create restored target file 224) from the virtual machine backup image by using the generated catalog (e.g., catalog 222) to identify the storage location (e.g., storage location 220) included in the target virtual machine backup image that is associated with the extent of the target file (e.g., extent 214), and accessing data stored at the identified storage location (e.g., storage location 220) included in the virtual machine backup image.

Computing device 202 generally represents any type or form of computing device capable of reading computer-executable instructions. For example, computing device 202 may be an application server configured to selectively restore files from virtual machine backup images. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device. In some embodiments, computing device 202 may represent an application server configured to provide various services and/or run certain software applications.

Many other devices or subsystems may be connected to example system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
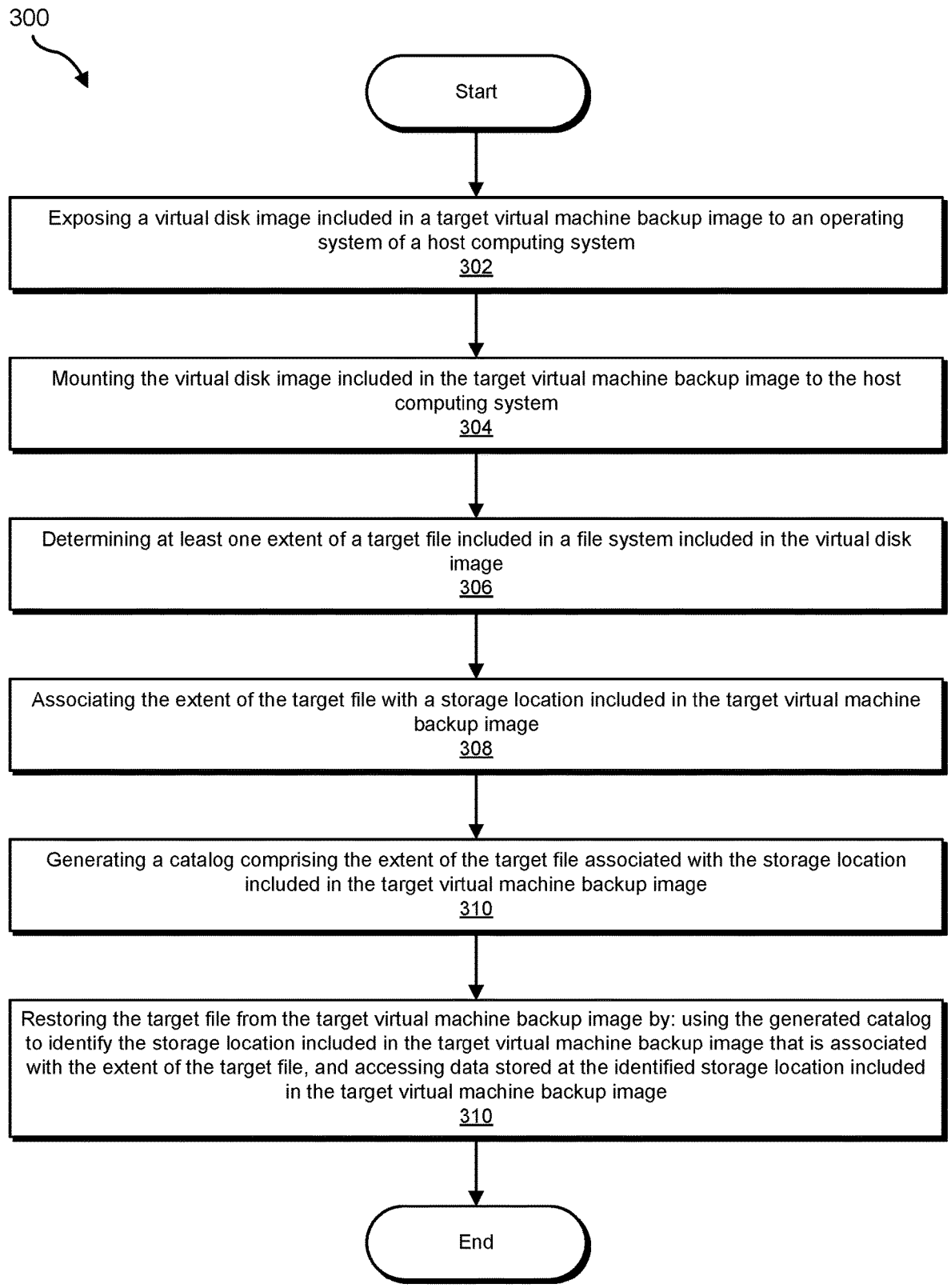
FIG. 3 is a flow diagram of an example method for selectively restoring files from virtual machine backup images.

FIG. 3 is a flow diagram of an example computer-implemented method 300 for selectively restoring files from virtual machine backup images. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may expose a virtual disk image included in a target virtual machine backup image to an operating system of a host computing system. For example, exposing module 104 may, as part of computing device 202 in FIG. 2, expose virtual disk image 208 to operating system 204.

As used herein, the phrase "virtual machine" generally represents any operating system environment that is abstracted from computing hardware by a virtual machine manager (e.g., a hypervisor). Likewise, as used herein, the phrase "backup image" generally refers to any type or form of file that includes a complete or partial copy of the contents and/or data located on a computing or storage device at a particular point in time. Hence, as used herein, the phrase "virtual machine backup image" generally refers to any type or form of file that includes a complete or partial copy of the contents and/or data located on a virtual machine computing or storage device at a particular point in time. Examples of such virtual machine backup images may include, without limitation, full virtual machine backup images, incremental virtual machine backup images, differential virtual machine backup images, accelerated virtual machine backup images, deduplicated virtual machine backup images, synthetic virtual machine backup images, snapshots, combinations of one or more of the same, or any other suitable virtual machine backup images.

For example, a virtual machine backup image (e.g., target virtual machine backup image 122) may include an initial virtual machine backup image that includes at least part of the data included in a virtual machine at a particular time. Such a backup image may be a full backup of the virtual machine. In other examples, a virtual machine backup image may include a differential virtual machine backup image based on the initial virtual machine backup image. In such examples, the differential virtual machine backup image may include data that has changed or been added to the virtual machine since the particular time of the initial virtual machine backup image.

As used herein, the phrase "virtual disk image" may refer to any file or other data object containing data stored for the use of a virtual machine. In some examples, the data as stored within the virtual disk image may reflect the raw contents and/or structure of a virtual storage device. A virtual disk image may be structured in accordance with any virtual disk image format, including, but not limited to, VMDK, VDI, VHD, HDD, and so forth.

Exposing module 104 may expose virtual disk image 208 to operating system 204 in a variety of ways. For example, exposing module 104 may expose virtual disk image 208 to operating system 204 by creating a user-space file system that includes the virtual disk image in a user space of the host computing system. As used herein, a "user-space file system" may be any file system that at least partially executes in a user space of computing device 202. Such a file system may be created and/or implemented via a driver that utilizes a FUSE (i.e., File System in User Space) interface.

In some implementations, a FUSE interface may be an interface for user space programs to export a file system to an operating system kernel (e.g., a Linux kernel). FUSE may include a FUSE kernel module and user space library that communicates with the FUSE kernel module. A FUSE file system may be implemented as a user space driver application that links with the user space library. The user space driver application (e.g., the FUSE driver) may issue calls to and receive responses from the FUSE kernel module via the FUSE user space library.

A FUSE driver may translate standard file system operations (e.g., open( ), read( ), write( ), etc.) into user-space interactions with data sources (e.g., web services, archive files, remote serves, databases, backup images, etc.). When a data source is mounted as a file system using such a FUSE driver, the host computing system may be able to access the data source using standard file operation system calls, which then call the translation code included in the FUSE driver.

This configuration may provide a useful abstraction that may allow a computing system to interact with any data source (e.g., archive files, servers, databases, web services, backup images, etc.) as if that data source were part of a local file system. For example, a backup system may provide a user-space interface to allow interaction (e.g., read requests, write requests, etc.) with contents of a virtual machine backup image (e.g., a virtual disk image included in the virtual machine backup image). A FUSE driver (e.g., FUSE driver 210) may translate standard file system operations to these user-space interfaces, and hence may expose contents of a virtual machine backup image (e.g., virtual disk images) to an operating system of a host computing system (e.g., computing device 202) as if the contents were simply files and folders within a file system of the host computing system (e.g., within user space file system 212 of host file system 206).

FUSE driver 210 may thus allow modules 102 to access and/or treat virtual disk image 208, as included in target virtual machine backup image 122, as a file accessible to operating system 204 (e.g., as part of host file system 206). In this and other ways, modules 102 (e.g., exposing module 104) may expose virtual disk image 208 to operating system 204.

Additionally, as will be described in greater detail below, in some implementations, FUSE driver 210 may also monitor a data source (e.g., target virtual machine backup image 122) to detect and/or identify file system operations that occur with respect to the data source. For example, if a file system operation reads from or writes to a data storage location included in target virtual machine backup image 122 while FUSE driver 210 is exposing virtual disk image 208 to operating system 204, FUSE driver 210 may detect, identify, and/or record such file system operations.

Returning to FIG. 3, at operation 304, one or more of the systems described herein may mount a virtual disk image included in a target virtual machine backup image to a host computing system. For example, mounting module 106 may, as part of computing device 202 in FIG. 2, mount virtual disk image 208 included in target virtual machine backup image 122 to computing device 202.

The terms "mount" and "mounting," as used herein, generally refer to the act of making a storage disk accessible to a physical or virtual computing device. The act of mounting a storage disk may involve configuring a file system by which an operating system running on the physical or virtual computing device is able to read from and/or write to the storage disk. For example, mounting module 106 may, as part of mounting virtual disk image 208 to computing device 202, configure host file system 206 to access data included in virtual disk image 208. Additionally or alternatively, mounting module 106 may also configure a file system included in virtual disk image 208 (e.g., virtual disk file system 218) to communicate with operating system 204 via host file system 206. This mounting process may enable operating system 204 to interact with (e.g., read data from and/or write data to) files and/or folders included within virtual disk image 208.

Mounting module 106 may mount virtual disk image 208 included in target virtual machine backup image 122 to computing device 202 in a variety of ways. For example, mounting module 106 may mount virtual disk image 208 to computing device 202 by mounting virtual disk image 208 to host file system 206 as a loop device. A loop device (also a "loopback device") may be a pseudo-device that treats a file (e.g., virtual disk image 208) as a block storage device (e.g., a hard disk drive). The loop device may be associated with virtual disk image 208, and then logically connected to (e.g., mounted to) host file system 206 at a mount point within host file system 206, such as a directory.

A loop device may provide an API to access a file system stored within virtual disk image 208 (e.g., virtual disk file system 218) by interpreting or translating raw data included in virtual disk image 208 into one or more regular files and/or directories. Thus, operating system 204 may interact with (e.g., read, write, and/or otherwise interact with) file data included in virtual disk image 208 by way of a loop device.

Additionally or alternatively, mounting module 106 may mount virtual disk image 208 to computing device 202 by mounting virtual disk image 208 to host file system 206 as a network block device. A network block device may simulate a local block device, such as a hard drive, but may actually connect to a storage medium on a remote server. Although generally used for mounting remote storage resources to local file systems, a network block device server/client system may also mount a local file that includes data organized in accordance with a file system to a local file system. Thus, a network block device may provide another mechanism for operating system 204 to interact with (e.g., read, write, and/or otherwise interact with) file data included in virtual disk image 208.

By mounting virtual disk image 208 to computing device 202, the systems and methods described herein may allow operating system 204 to read, write, query, and otherwise interact with files and folders included in a file system included in virtual disk image 208 (e.g., virtual disk file system 218) while virtual disk image 208 remains stored within target virtual machine backup image 122. This in-place access may save storage resources, and may allow for additional operations involving data stored within target virtual machine backup image 122.

Returning to FIG. 3, at operation 306, one or more of the systems described herein may determine at least one extent of a target file included in a file system included in a virtual disk image. For example, determining module 108 may, as part of computing device 202 in FIG. 2, determine extent 214 of target file 216 included in virtual disk file system 218 included in virtual disk image 208.

As described above, an extent generally refers to a contiguous area of computer storage reserved for a file in a file system. For example, extent 214 may indicate that a portion of target file 216 is located at a contiguous portion of storage within virtual disk file system 218 beginning at storage block 11, and extending for 20 storage blocks. By determining extents of target file 216, determining module 108 may identify specific blocks of data included within virtual disk image 208 that correspond to portions of target file 216.

Determining module 108 may determine extent 214 of target file 216 included in virtual disk file system 218 included in virtual disk image 208 in a variety of ways. For example, determining module 108 may query operating system 204 to identify extent 214. As operating system 204 may have access to virtual disk file system 218 (e.g., as a result of operations performed by exposing module 104 and mounting module 106 described above), determining module 108 may query operating system 204 to identify one or more extents of target file 216, including, but not limited to, extent 214.

Additionally or alternatively, determining module 108 may determine an extent of target file 216 by accessing an entry in a file index maintained by virtual disk file system 218. A file system that utilizes an extent-based architecture may maintain a file index that may indicate extents of files stored within the file system. For example, NTFS volumes may maintain a master file table (MFT) that includes pointers to extents (or pointers to other MFT files that include pointers to extents) of individual files. As another example, EXT4 file systems may maintain inodes and/or extent trees that indicate blocks of data that are associated with extents of individual files. Other examples of a file index that may be maintained by a file system and that may indicate an extent of a target file may include, but are not limited to, a file allocation table, an inode table, a dnode array, an extent list, a file extent map, a file block map, and so forth.

Figure 4:
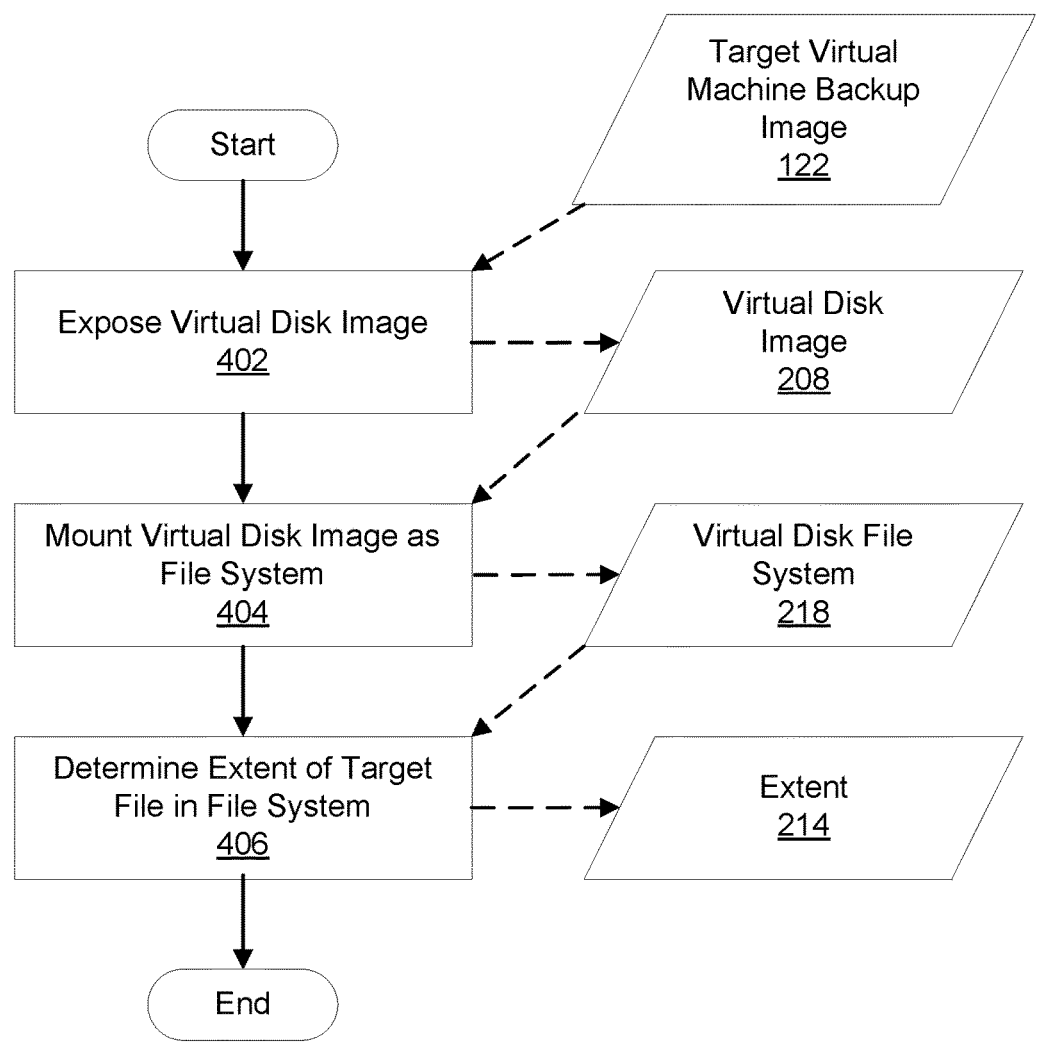
FIG. 4 illustrates a potential operational flow for exposing a virtual disk image included in a target virtual machine backup image to an operating system of a host computing system, mounting the virtual disk image included in the target virtual machine backup image to the host computing system, and determining an extent of a file included in a target virtual machine image in accordance with some example embodiments.

FIG. 4 illustrates a potential operational flow 400 for exposing virtual disk image 208 included in target virtual machine backup image 122, mounting virtual disk image 208 to computing device 202, and determining extent 214 of target file 216. As shown, in step 402, exposing module 104 may expose virtual disk image 208 included in target virtual machine backup image 122 to operating system 204, which may render virtual disk image 208 accessible to operating system 204. In step 404, mounting module 106 may mount virtual disk image 208 to computing device 202 via host file system 206, which may make virtual disk file system 218 accessible to operating system 204. In step 406, determining module 108 may determine an extent (e.g., at least one extent) of target file 216 as stored within virtual disk file system 218.

Returning to FIG. 3, at operation 308, one or more of the systems described herein may associate an extent of a target file with a storage location included in a target virtual machine backup image. For example, associating module 110 may, as part of computing device 202 in FIG. 2, associate extent 214 of target file 216 with storage location 220 in target virtual machine backup image 122.

By associating extent 214 with storage location 220, associating module 110 may later reference storage location 220 in order to recover extent 214 of target file 216 directly from target virtual machine backup image 122. This may allow modules 102 (e.g., restoring module 114) to recover target file 216 directly from target virtual machine backup image 122 without additional computing resources (e.g., another physical or virtual computing device) or costly file system mapping tools, and without needing to again perform the exposing, mounting, and determining operations described above.

Associating module 110 may associate extent 214 of target file 216 with storage location 220 in target virtual machine backup image 122 in a variety of ways. For example, associating module 110 may associate extent 214 with storage location 220 by directing operating system 204 to access target file 216. Associating module 110 may direct operating system 204 to access target file 216 in any suitable way, such as by directing operating system 204 to read from, write to, and/or otherwise interact with target file 216. In some examples, associating module 110 may direct operating system 204 to perform a simulated read of target file 216.

Associating module 110 may also identify a storage block included in target virtual machine backup image 122 that operating system 204 accesses when it is directed to access target file 216. Associating module 110 may identify the storage block in any suitable way. For example, as mentioned above, in some implementations, FUSE driver 210 may monitor file system operations that occur with respect to target virtual machine backup image 122 while FUSE driver 210 is exposing virtual disk image 208 to operating system 204. This may allow FUSE driver 210 to identify one or more file system operations that operating system 204 performs with respect to target virtual machine backup image 122 when operating system 204 is directed to access target file 216. This monitoring may allow associating module 112 to identify a storage block included in target virtual machine backup image 122 that operating system 204 accesses when it is directed to access target file 216. Associating module 110 may then designate the identified storage block as the storage location associated with extent 214.

Figure 5:
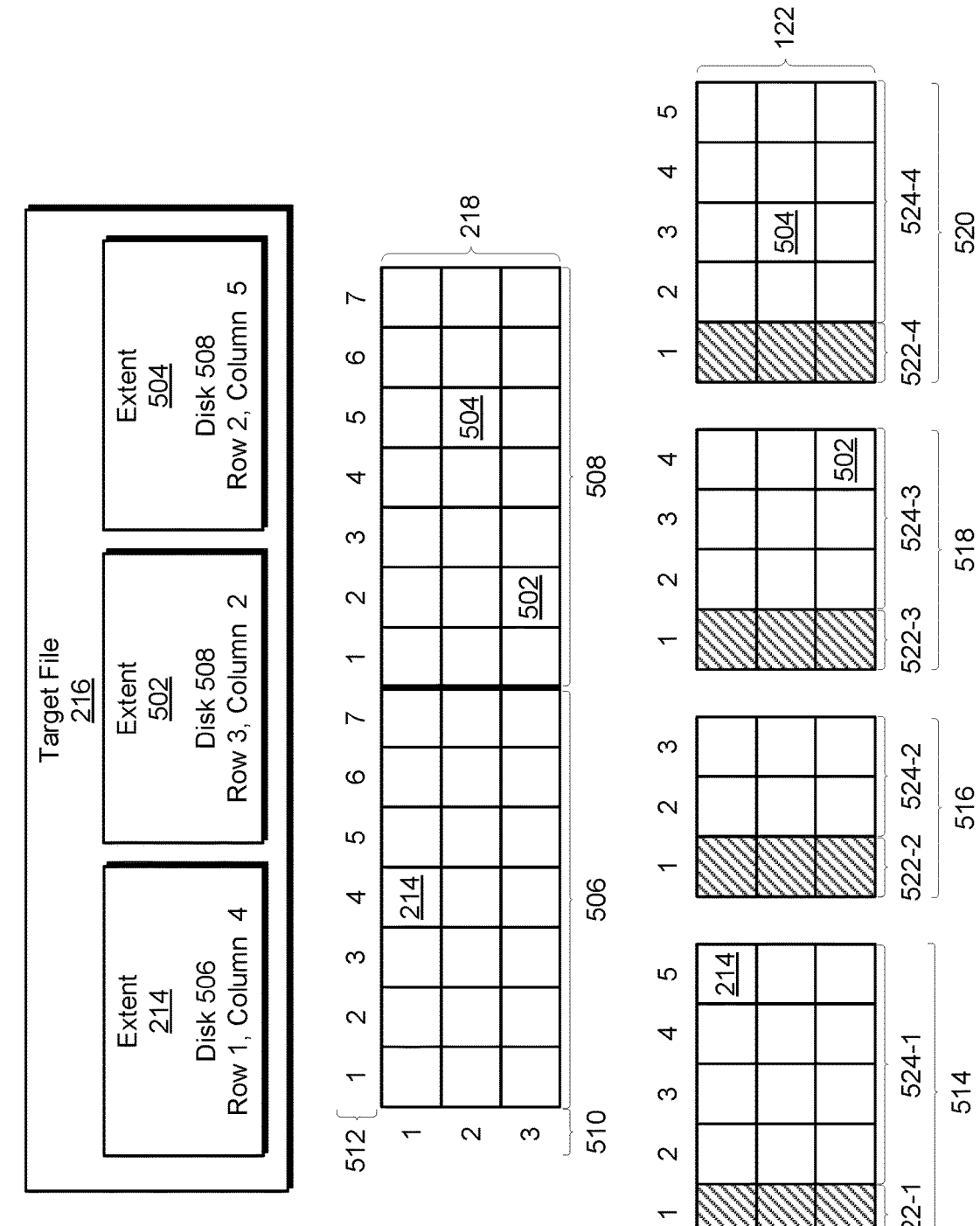
FIG. 5 illustrates associating extents of a target file with storage locations in a target virtual machine backup image in accordance with some example embodiments.

By way of illustration, FIG. 5 shows a block diagram 500 that illustrates associating extents of target file 216 with storage locations in target virtual machine backup image 122. As shown, FIG. 5 includes target file 216, and target file 216 includes extent 214. For the purposes of this illustration, target file 216 may further include extent 502, and extent 504. FIG. 5 further includes virtual disk file system 218. For the purposes of this illustration, virtual disk file system 218 may span (e.g., via a suitable logical volume manager) two physical volumes: disk 506 and disk 508. FIG. 5 also includes column indicators 510 and row indicators 512 that may indicate relative positions of storage blocks included in virtual disk file system 218.

As shown, extent 214 indicates that a portion of target file 216 is located on disk 506 at row 1, column 4. Extent 502 indicates that another portion of target file 216 is located on disk 508 at row 3, column 2. Extent 504 indicates that another portion of target file 216 is located on disk 508 at row 2, column 5.

FIG. 5 also shows target virtual machine backup image 122, and indicates that it includes four fragments: fragment 514, fragment 516, fragment 518, and fragment 520. Each fragment may represent a portion of an initial virtual machine backup image and/or a portion of an incremental virtual machine backup image. Each fragment may also include a segment of metadata (i.e., metadata 522-1 through 522-4) associated with target virtual machine backup image 122, and a set of data blocks (i.e., data blocks 524-1 through 524-4) that include data from file system 218 and/or disk 506 and/or disk 508. FIG. 5 also includes row indicators 528 and column indicators 530 that may indicate relative positions of storage blocks included in target virtual machine backup image 122.

Associating module 110 may direct operating system 204 to access target file 216, and may use FUSE driver 210 to identify one or more storage blocks of target virtual machine backup image 122 that operating system 204 accesses when so directed. Associating module 110 may then designate the identified storage blocks as the storage locations associated with the extents of target file 216. As shown in FIG. 5, associating module 110 may identify and designate at least one storage block located in fragment 518 at row 1, column 5 as the storage location associated with extent 214, at least one storage block located in fragment 522 at row 3, column 4 as the storage location associated with extent 502, and at least one storage block located in fragment 524 at row 2, column 4 as the storage location associated with extent 504.

Returning to FIG. 3, at operation 310, one or more of the systems described herein may generate a catalog that may include an extent of a target file associated with a storage location included in a target virtual machine backup image. For example, generating module 112 may, as part of computing device 202 in FIG. 2, generate catalog 222 that may include extent 214 of target file 216 associated with storage location 220 included in target virtual machine backup image 122. Catalog 222 may include any suitable data structure, such as a table, a list, a map, and so forth.

Figure 6:
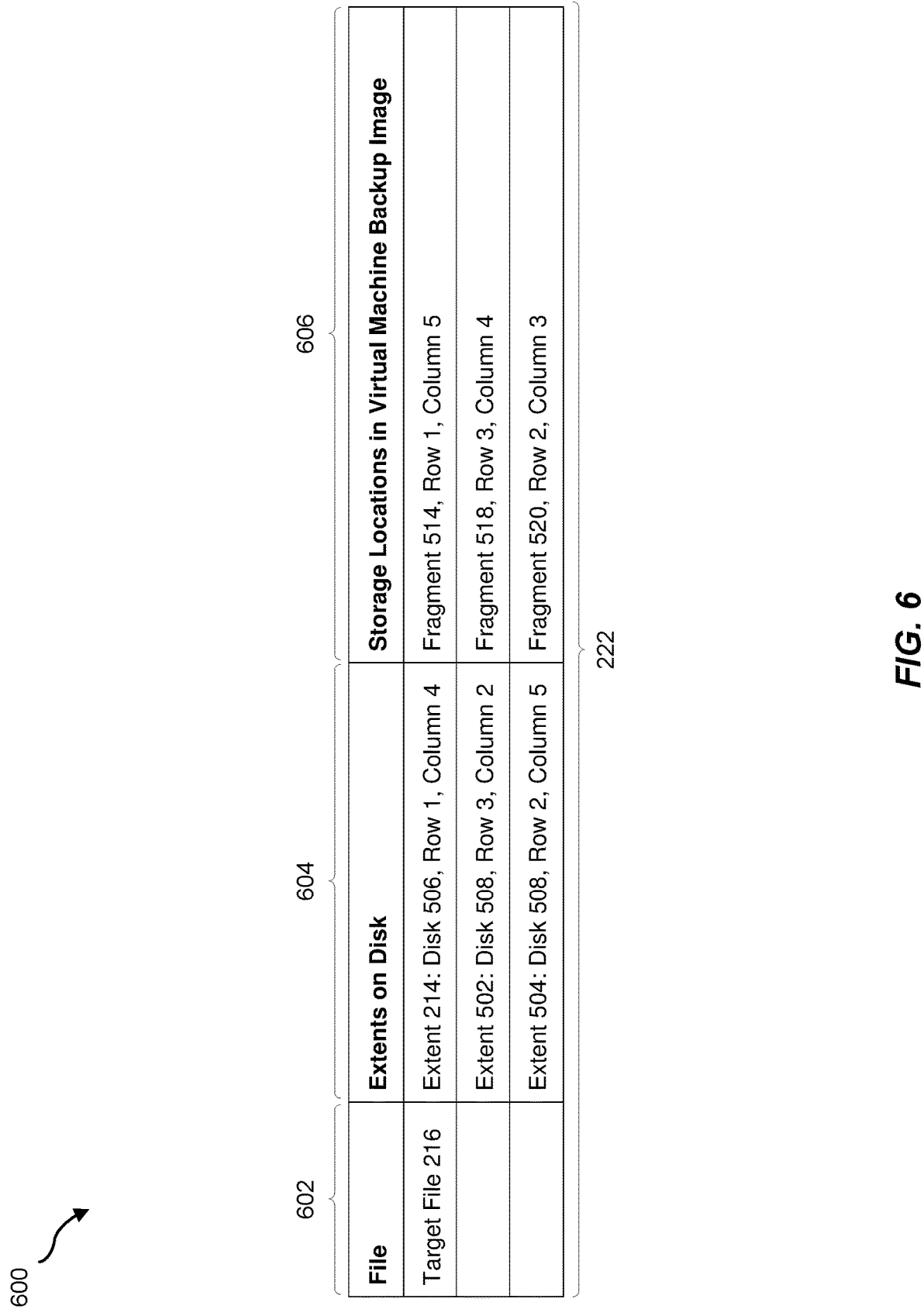
FIG. 6 illustrates an example catalog that includes the extents of a target file associated with storage locations included in a target virtual machine backup image in accordance with some example embodiments.

Generating module 112 may generate catalog 222 that may include extent 214 of target file 216 associated with storage location 220 included in target virtual machine backup image 122 in a variety of ways. For example, FIG. 6 illustrates a view 600 of an example catalog (e.g., catalog 222) that includes the extents (e.g., extent 214, extent 502, and extent 504) of a target file (e.g., target file 216) associated with storage locations included in a target virtual machine backup image (e.g., target virtual machine backup image 122). As shown, catalog 222 includes column 602 that indicates target file 216, column 604 that indicates extents on disk that correspond to target file 216, and column 606 that indicates storage locations in target virtual machine backup image 122 that are associated with the extents in column 604.

In some embodiments, generating module 112 may omit data associated with extents of a target file (i.e., locations of data blocks in virtual disk image 208 and/or virtual disk file system 218) from catalog 222. Once storage locations within target virtual machine backup image 122 that are associated with extents of target file 216 (e.g., extent 214, extent 502, and extent 504) have been determined, the original locations of the data included in those extents in virtual disk image 208 and/or virtual disk file system 218 are not needed to recover target file 216 from target virtual machine backup image 122. Hence, in some embodiments, data represented in column 604 may be omitted from catalog 222.

In some implementations, one or more of modules 102 (e.g., determining module 108, associating module 110, generating module 112, etc.) may utilize the systems and methods described herein to generate a catalog (e.g., catalog 222) that includes extents corresponding to multiple files included in a file system included in virtual disk included a virtual machine backup image associated with storage locations in the virtual machine backup image. In this and other ways, any and/or all data associated with any and/or all files included in the virtual machine backup image may be located within, and hence restored from, the virtual machine backup image directly, using only the generated catalog and the virtual machine backup image itself.

Returning to FIG. 3, at operation 312, one or more of the systems described herein may restore a target file from a target virtual machine backup image by (i) using a generated catalog to identify a storage location included in a target virtual machine backup image that is associated with an extent of a target file, and (ii) accessing data stored at the identified storage location included in the target virtual machine backup image. For example, restoring module 114 may, as part of computing device 202 in FIG. 2, restore target file 216 (e.g., generate restored target file 224) from target virtual machine backup image 122 by (i) using catalog 222 to identify storage location 220 included in target virtual machine backup image 122 that is associated with extent 214 of target file 216, and (ii) accessing data stored at storage location 220 included in target virtual machine backup image 122.

Restoring module 114 may restore target file 216 (e.g., generate restored target file 224) from target virtual machine backup image 122 in a variety of ways. For example, restoring module 114 may access catalog 222 and reference column 602 to identify target file 216, column 604 to identify extents of target file 216 (e.g., extent 214, extent 502, and/or extent 504), and column 606 to identify storage locations in target virtual machine backup image 122 that correspond to the extents of target file 216. As mentioned above, in some implementations, the data shown in column 604 in FIG. 6 may be omitted from catalog 222. In such implementations, restoring module may reference column 602 to identify target file 216 and column 606 to identify storage locations included in target virtual machine backup image 122 that correspond to portions of target file 216. Restoring module 114 may then access the identified storage locations corresponding to the extents of target file 216, and then create a restored target file (e.g., restored target file 224) that includes the same data as target file 216.

Figure 7:
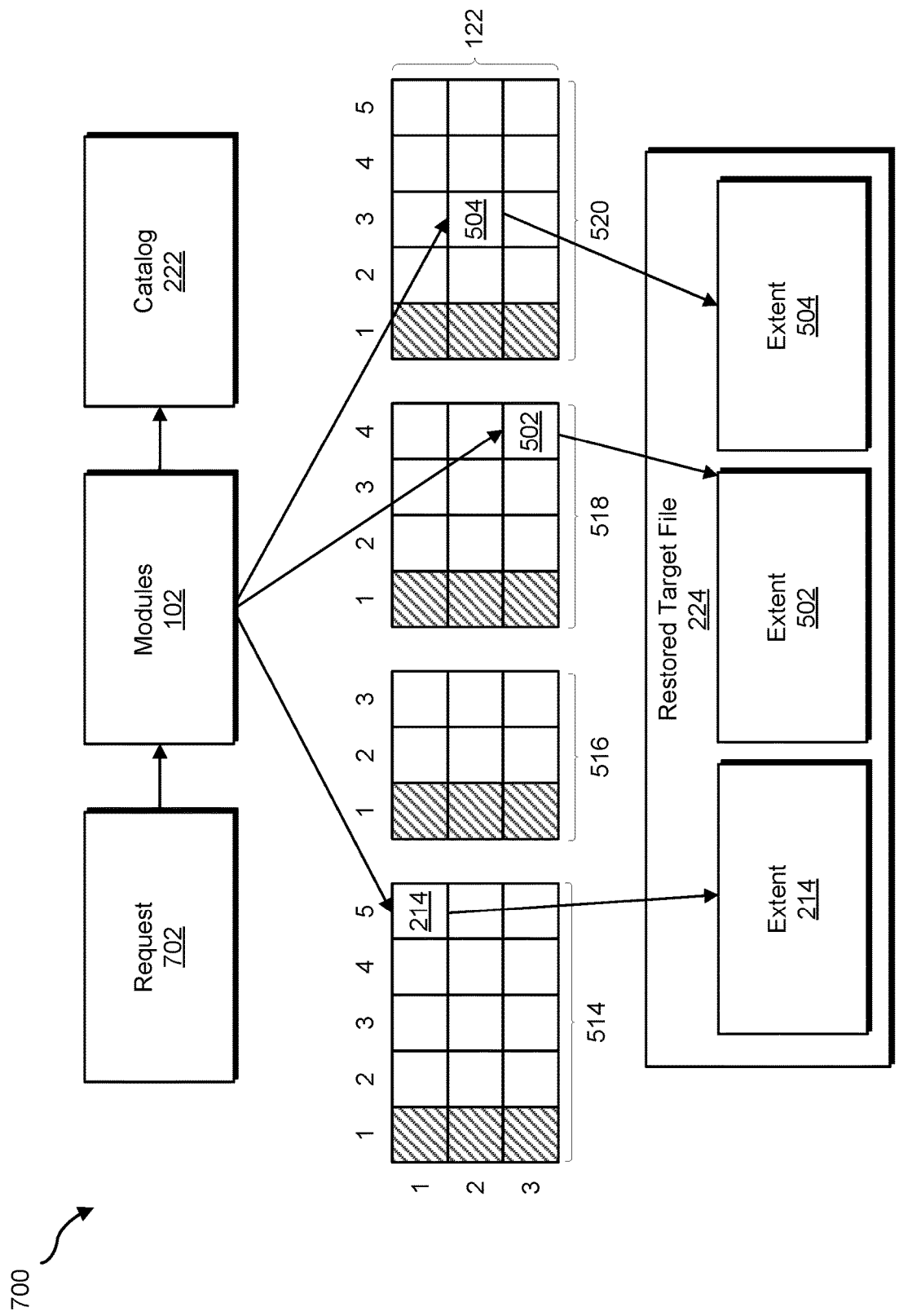
FIG. 7 illustrates restoring a target file from a target virtual machine backup image in accordance with some example embodiments.

FIG. 7 includes a block diagram 700 that illustrates restoring a target file from a target virtual machine backup image by using a generated catalog to identify the storage locations included in the target virtual machine backup image that are associated with the extents of the target file. As shown, one or more modules 102 (e.g., restoring module 114) may receive a request 702 from a requesting party (e.g., a user, an administrator, etc.) to recover and/or restore target file 216. In response, one or more modules 102 (e.g., restoring module 114) may reference catalog 222 to identify one or more storage locations included in target virtual machine backup image 122 that include data associated with one or more extents of target file 216. In this example, catalog 222 has already been created, and includes the data shown in FIG. 6. Therefore, the one or more modules 102 (e.g., restoring module 114) may identify row 1, column 5 of fragment 514 as including data that corresponds to extent 214, row 3, column 4 of fragment 518 as including data that corresponds to extent 502, and row 2, column 3 of fragment 502 as including data that corresponds to extent 504.

One or more modules 102 (e.g., restoring module 114) may then access those identified storage locations within target virtual machine backup image 122 and create restored target file 224 from the data included in those identified storage locations. In some examples, restored target file 224 may include any and/or all data included in target file 216. In some examples, restored target file 224 may be a bit-for-bit copy of target file 216.

Once restored target file 224 has been created, one or more modules 102 (e.g., restoring module 114) may then make restored target file 224 available to the requesting party, such as by placing the file in a shared directory on a shared storage device, and/or by transmitting restored target file 224 to the requesting party via a suitable data transmission network.

As discussed throughout the instant disclosure, the disclosed systems and methods may provide one or more advantages over traditional selective file restoration systems and methods. For example, exposing and mounting a virtual disk image included in a target virtual machine backup image to an operating system of a host computing system may allow one or more of the systems described herein to leverage operating-system-level resources of the host computing system (e.g., kernels, operating systems, volume managers, file systems, etc.) to determine extents of files included in the virtual disk image.

In addition, utilizing a FUSE driver to monitor file operations that occur with respect to the target virtual machine backup image while the operating system accesses a target file from within the virtual disk image may allow the systems and methods described herein to associate particular storage locations within the virtual machine backup image with one or more extents of the target file. Generating a catalog of these associations may allow for later restoration of files directly from the virtual machine backup image, without additional exposing and mounting of the virtual disk image included in the virtual machine backup image. The systems and methods described herein may then later utilize the catalog to restore the target file from the virtual machine backup image by directly accessing the storage locations within the virtual machine backup image that are associated with the extents of the target file.

The systems and methods described herein may therefore provide for selective file restoration from a virtual machine backup image by using capabilities already built into a host computing system, without extensive reverse-engineering of various layers of backup image formats, virtual disk image formats and file systems, and without any need to create intermediate copies of data from layer to layer. Additionally, the systems and methods may be more reliable, deterministic, and more efficient than other selective file restoration solutions, while also providing support for virtually all virtual disk image types (e.g., VMDK, VDI, VHD, HDD, etc.), file systems (NTFS, XFS, BTRFS, ZFS, HFS, etc.), backup types (e.g., full, incremental, differential, etc.) and snapshot types.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selectively restoring files from virtual machine backup images, at least a portion of the method being performed by a computing device comprising at least one processor, the method comprising:

exposing a virtual disk image included in a target virtual machine backup image to an operating system of a host computing system;

mounting the virtual disk image included in the target virtual machine backup image to the host computing system;

determining at least one extent of a target file included in a file system included in the virtual disk image at least in part by querying the operating system of the host computing system to identify the extent of the target file;

associating the extent of the target file with a storage location included in the target virtual machine backup image;

generating a catalog that indicates a mapping between extents on disk for the target file and storage locations for fragments included in the target virtual machine backup image; and restoring the target file from the target virtual machine backup image by:

identifying, by using the mapping from the generated catalog, the storage location included in the target virtual machine backup image that is associated with the extent of the target file; and accessing data stored at the identified storage location included in the target virtual machine backup image;

providing selective file restoration of the fragments from the target virtual machine backup image.

2. The computer-implemented method of claim 1, wherein exposing the virtual disk image included in the target virtual machine backup image to the operating system of the host computing system comprises creating a user space file system that includes the virtual disk image in a user space of the host computing system.

3. The computer-implemented method of claim 2, wherein creating the user space file system in the user space of the host computing system comprises using a file-system-in-user-space (FUSE) driver to create the user space file system based on the target virtual machine backup image.

4. The computer-implemented method of claim 3, wherein associating the extent of the target file included in the file system included in the virtual disk image with at least one storage location included in the target virtual machine backup image comprises:

directing the operating system of the host computing system to access the target file;

identifying a storage block included in the target virtual machine backup image that the operating system of the host computing system accesses when the operating system of the host computing system is directed to access the target file; and designating the identified storage block as the storage location associated with the extent of the target file included in the file system.

5. The computer-implemented method of claim 4, wherein directing the operating system of the host computing system to access the target file included in the file system comprises directing the operating system of the host computing system to perform a simulated read of the target file.

6. The computer-implemented method of claim 4, wherein identifying the storage block included in the target virtual machine backup image that the operating system of the host computing system accesses when the operating system of the host computing system is directed to access the target file comprises using the FUSE driver to monitor the target virtual machine backup image to identify one or more file system operations that the operating system of the host computing system performs with respect to the target virtual machine backup image when the operating system of the host computing system is directed to access the target file.

7. The computer-implemented method of claim 1, wherein providing selective file restoration of the fragments from the target virtual machine backup image is performed using capabilities already built into the host computing system without file system reverse-engineering.

8. The computer-implemented method of claim 1, wherein mounting the virtual disk image to the host computing system comprises mounting the virtual disk image to the host computing system as a network block device.

9. The computer-implemented method of claim 1, wherein determining the extent of the target file comprises accessing at least one entry in a file index maintained by the file system included in the virtual disk image.

10. The computer-implemented method of claim 9, wherein the file index comprises at least one of:
an extent tree;
an extent list;
a file extent map;
a file block map;
a file allocation table;
a master file table;
an inode table; and
a dnode array.

11. The computer-implemented method of claim 1, wherein the target virtual machine backup image comprises an initial virtual machine backup image.

12. The computer-implemented method of claim 11, wherein the target virtual machine backup image further comprises a differential virtual machine backup image based on the initial virtual machine backup image.

13. A system for selectively restoring files from virtual machine backup images, the system comprising:
an exposing module, stored in memory, that exposes a virtual disk image included in a target virtual machine backup image to an operating system of a host computing system;
a mounting module, stored in memory, that mounts the virtual disk image included in the target virtual machine backup image to the host computing system;
a determining module, stored in memory, that determines at least one extent of a target file included in a file system included in the virtual disk image at least in part by querying the operating system of the host computing system to identify the extent of the target file;
an associating module, stored in memory, that associates the extent of the target file with a storage location included in the target virtual machine backup image; and a generating module, stored in memory, that generates a catalog that indicates a mapping between extents on disk for the target file and storage locations for fragments included in the target virtual machine backup image; and
a restoring module, stored in memory, that restores the target file from the target virtual machine backup image by:
identifying, by using the mapping from the generated catalog, the storage location included in the target virtual machine backup image that is associated with the extent of the target file; and
accessing data stored at the identified storage location included in the virtual machine backup image; and
at least one processor that executes the exposing module, the mounting module, the determining module, the associating module, the generating module, and the restoring module;
wherein the restoration module provides selective file restoration of the fragments from the target virtual machine backup image.

14. The system of claim 13, wherein exposing the virtual disk image included in the target virtual machine backup image to the operating system of the host computing system comprises using a file-system-in-user-space (FUSE) driver to create a user space file system that includes the virtual disk image in a user space of the host computing system.

15. The system of claim 14, wherein associating the extent of the target file included in the file system included in the virtual disk image with at least one storage location included in the target virtual machine backup image comprises:
directing the operating system of the host computing system to access the target file;
identifying a storage block included in the target virtual machine backup image that the operating system of the host computing system accesses when the operating system is directed to access the target file; and
designating the identified storage block as the storage location associated with the extent of the target file included in the file system.

16. The system of claim 15, wherein directing the operating system of the host computing system to access the target file included in the file system comprises directing the operating system of the host computing system to perform a simulated read of the target file.

17. The system of claim 15, wherein identifying the storage block included in the target virtual machine backup image that the operating system of the host computing system accesses when the operating system is directed to access the target file comprises using the FUSE driver to monitor the target virtual machine backup image to identify one or more file system operations that the operating system performs with respect to the target virtual machine backup image when the operating system of the host computing system is directed to access the target file.

18. The system of claim 13, wherein mounting the virtual disk image to the host computing system comprises mounting the virtual disk image to the host computing system as a loop device.

19. The system of claim 13, wherein mounting the virtual disk image to the host computing system comprises mounting the virtual disk image to the host computing system as a network block device.

20. A non-transitory computer-readable medium comprising one or more computer-executable instructions that, when executed by at least one processor of a computing device, cause the computing device to:

expose a virtual disk image included in a target virtual machine backup image to an operating system of a host computing system;

mount the virtual disk image included in the target virtual machine backup image to the host computing system;

determine at least one extent of a target file included in a file system included in the virtual disk image at least in part by querying the operating system of the host computing system to identify the extent of the target file;

associate the extent of the target file with a storage location included in the target virtual machine backup image; and generate a catalog that indicates a mapping between extents on disk for the target file and storage locations for fragments included in the target virtual machine backup image; and restore the target file from the target virtual machine backup image by: using the generated catalog to identify the storage location included in the target virtual machine backup image that is associated with the extent of the target file; and accessing data stored at the identified storage location included in the target virtual machine backup image; provide selective file restoration of the fragments from the target virtual machine backup image.

* * * * *